Sept. 24, 1968   J. F. ENGLE   3,402,797

DIFFERENTIAL MECHANISM

Original Filed July 29, 1965

Inventor
JACK F. ENGLE

By John W Butcher
Atty

United States Patent Office 3,402,797
Patented Sept. 24, 1968

3,402,797
DIFFERENTIAL MECHANISM
Jack F. Engle, Auburn, Ind., assignor to Borg-Warner Corporation, Chicago, Ill., a corporation of Illinois
Original application July 29, 1965, Ser. No. 475,814, now Patent No. 3,327,563, dated June 27, 1967. Divided and this application May 10, 1967, Ser. No. 655,691
3 Claims. (Cl. 192—107)

ABSTRACT OF THE DISCLOSURE

An insert for a limited slip differential mechanism defining a conical clutch member seating surface including a flange adjacent the convergent end of the seating surface to radially and axially position the insert and a flange associated with the divergent end of the conical seating surface to effect a driving connection between the insert and the differential casing.

---

The present invention is a divisional application of Ser. No. 475,814, now Pat. No. 3,327,563, filed July 29, 1965, entitled Differential Mechanism.

This invention relates to limited slip differential mechanisms which provide a predetermined resistance to differential action. More particularly, it relates to limited slip differential mechanisms which utilize conically shaped clutch members to provide the resistance to free differentiation.

It is the principal object of the present invention to provide an improved form of limited slip differential mechanism utilizing a conically shaped clutch to resist differentiation.

It is a further object of the present invention to provide an improved form of limited slip differential mechanism utilizing conically shaped clutches to resist differentiation wherein the machining of conically shaped cone seat surfaces on the interior of the mechanism casing is eliminated.

It is another object of the present invention to provide an improved form of limited slip differential mechanism of the type described which includes separate removable inserts which form the conically shaped cone seat surfaces.

It is a further object of the present invention to provide a limited slip differential mechanism having removable cone seat inserts which are in driving engagement with the mechanism casing through the pinion pin.

It is another object of the present invention to provide a removable cone seat insert for a limited slip differential mechanism.

These and other objects of the present invention will become apparent with reference to the following description and the accompanying drawings.

Figure 1:
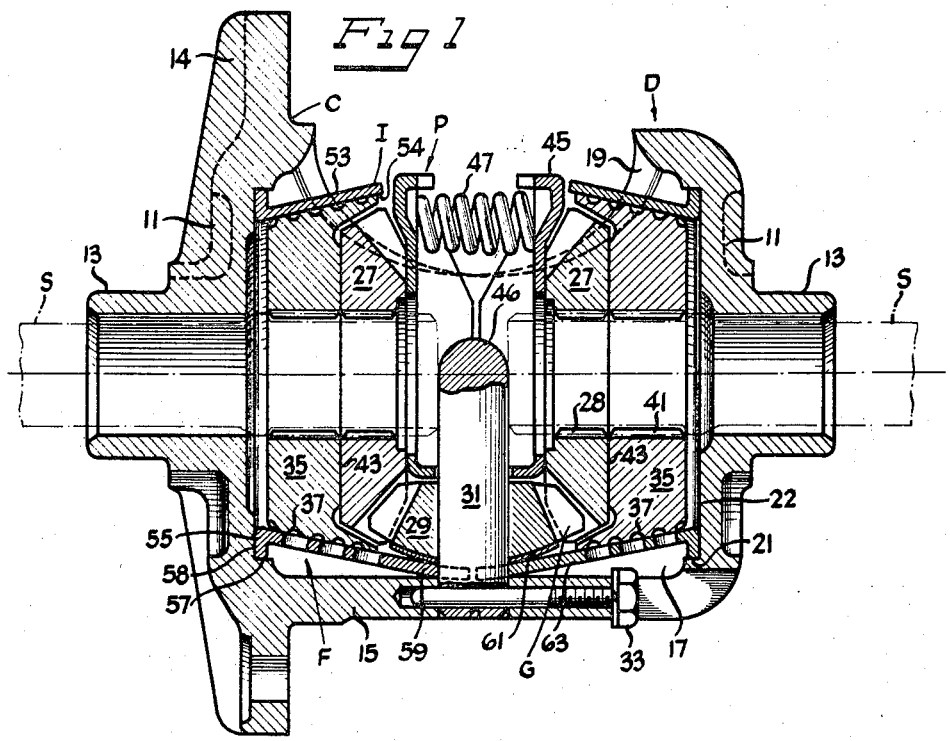
Figure 2:
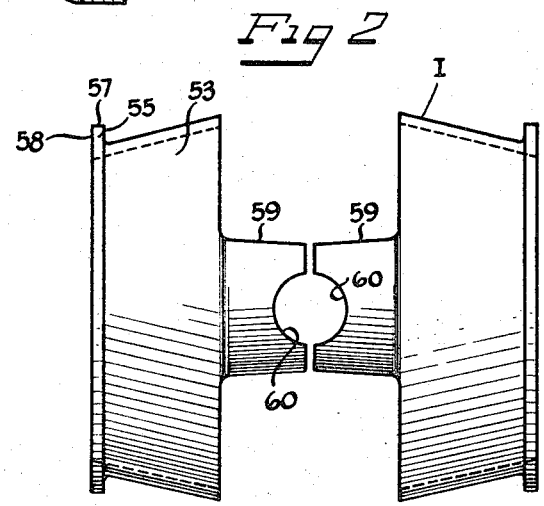

In the drawings:
FIGURE 1 is a revolved cross-sectional elevational view of a differential mechanism constructed in accordance with the present invention showing various of the features thereof;

FIGURE 2 is an elevational view of a portion of the apparatus of FIGURE 1 showing various other particular features of the invention.

Very generally, a differential mechanism D includes a casing C surrounding adjacent ends of a pair of axially aligned relatively rotatable output shafts S. The casing is adapted to receive input torque from a drive line system (not shown). A bevel gear system generally designated G is connected between the casing C and the shafts S and transmits rotational effort to the shafts while simultaneously allowing relative rotation between them when required as when an automotive vehicle negotiates a corner.

A pair of frictional clutches F provide the desired resistance to differential action. Of course only one such clutch associated with one of the output shafts could be used.

Each clutch includes a friction surface associated with the casing C and a friction surface associated with one of the output shafts S. Frictional engagement of these surfaces provides a direct path for transmission of rotation effort from the casing to the output shafts independent the bevel gear system G. The clutches, thus, overcome the inherent ability of the mechanism to allow differentiation between shafts, and torque is transmitted to both shafts even though they may experience unequal loading.

The friction surfaces of the clutch F are maintained in engagement by spring pack P which provides an initial preload to insure that at least a predetermined minimum resistance to differential action exists.

Each of the clutches F includes a removable insert I which is connected to the casing C for rotation therewith and which forms the friction surface of the clutch F associated with the casing C.

More specifically, and as best seen in FIGURE 1, the differential casing C is integrally formed as by casting, and may be constructed of any suitable material such as, for example, malleable iron.

The casing C includes a pair of spaced apart, generally parallel transverse walls 11 each of which includes a longitudinally elongated hub 13 adapted to receive one of the output shafts S. The hubs do not journal the shafts S, but rather support bearings (not shown) which support the mechanism D within the axle assembly.

One of the transverse walls 11 is provided with a radially directed flange 14 to which is secured a ring gear (not shown) adapted to receive input torque from the associated drive line system.

The transverse walls are connected by a longitudinally extending, generally cylindrical wall 15 which defines, with the walls 11, an internal cavity 17 surrounding the adjacent ends of the output shafts.

The cylindrical wall 15 is provided with a side port 19 defining a relatively large access opening for assembly purposes. The side port additionally allows lubricant to enter the cavity for lubrication of both the bevel gear system G and the clutches F.

The interior surface of each of the transverse walls 11 is provided with a generally cylindrical internal pilot relief or recess 21 disposed coaxially of the longitudinal axis of the shafts S and the hubs 13. The recess terminates in an axial stop surface 22 extending radially inwardly from the recess 21. The recess 21 and axial stop surface 22 act to position the insert I within the cavity 17 as will be explained.

Referring now to the bevel gear system G, best seen in FIGURE 1, there is provided an arrangement which transmits output torque to the shafts S and simultaneously allows relative rotation between shafts when necessary, as when a vehicle is cornering.

The bevel gear system includes a pair of side gears 27, each of which is connected to one of the shafts S for rotational movement therewith and axial movement thereon. To effect this relationship between the shafts and side gears, the adjacent ends of the shafts S and the internal bore of the gears are splined as at 28.

The side gears are in constant mesh with a pair of pinion gears 29 supported by a transversely extending pinion pin 31 disposed intermediate the adjacent ends of the shaft S and secured to the casing C for rotation therewith by retainer pin 33.

As can be appreciated, rotation of the differential casing C by the drive line system causes the pinion pin 31 to revolve about the centerline of the shafts S. The pinion gears 29, therefore, transcribe a generally cylindrical path about the axis of the shafts, and as they are in mesh with the side gears 27, the side gears are caused to rotate and thereby transmit torsional effort to the output shafts S.

If one of the output shafts is required to rotate at a different speed than the other, the pinion gears 29 not only revolve about the longitudinal axis of the output shafts but also rotate about the pinion pin 31 allowing relative movement between the side gears 27. Consequently, the output shafts S rotate relative to each other as well as relative to the casing C.

Differentiation, i.e., relative rotation between the shafts, inherently possible by virtue of the above described structure, is resisted by the engagement of the friction surfaces of the clutches F. Each of these clutches includes a frusto-conical clutch member 35 and one of the cone seat inserts I frictionally engaged by the member 35 along a complementary conical surface.

A spirally progressing groove 37 is provided in the conical surface of the clutch member 35 for distribution of oil or other lubricant to the frictionally engaged surfaces.

Each clutch member 35 includes an internally splined bore 41 connected to one of the shafts S and is, therefore, rotatable with the shaft and axially movable thereon. Each of the clutch members 35 is disposed between one of the transverse walls 11 of the casing C and one of the side gears 27. The respective side gear 27 and the clutch member 35 on each shaft S are in radial contact along the surface 43 and movement of either of these members toward the other, therefore, causes a corresponding movement of the other element in the same direction.

Application of axial force upon the side gears and consequently upon the clutch members 35 is accomplished in two ways; first, initial frictional engagement of the clutch members 35 with the drum or seat surfaces of the inserts I is provided by the spring pack P. The spring pack generally surrounds the transverse pinion pin 31 and includes a pair of gear contacting members 45, each of which is in contact with one of the side gears 27 adjacent the pinion pin. Each of the gear contacting members includes axially extending flanges having openings 46 to provide clearance for the pinion pin 31. A plurality of compressed coil springs 47 extend longitudinally between the contacting members 45 and urge them axially outwardly. This axial loading is transmitted to the side gears which are axially movable on the shafts S. The side gears, in turn, transmit the axial force to the clutch members 35, which are also splined to the shafts S and consequently are free to move axially into frictional engagement with the conical friction surface on the insert I.

Secondly, the initial frictional engagement of the clutch member 35 with the insert I, provided by the spring pack P, is increased, generally as a function of the torsional input to the mechanism casing C by the bevel gear system G.

Application of torque to the mechanism creates axial separating forces upon the side gears 27 which forces are, in turn, transferred to the clutch members 35 to provide a cumulative increased frictional engagement of the clutches with the conical inserts I to resist differentiation.

In accordance with the present invention, as best seen in FIGURE 1, the conical drum or seat surfaces frictionally engaged by the clutch members 35 are provided by the removable cone seat inserts I which form the friction surfaces of the clutches F associated with the casing C. These inserts include a generally conically shaped wall portion 53, the interior of which includes a conical seat surface 54 enaged by the clutch member 35. The inserts I may be formed of any suitable material such as, for example, steel, and may be made by any one of several manufacturing processes such as stamping, turning, spinning, grinding, etc.

The convergent end of the conical wall 53 of each insert is provided with a flange 55 extending generally radially outwardly forming a generally cylindrical pilot surface 57 having an outer diameter equal to the diameter of the recess 21, of the casing C. The insert is disposed within the differential casing with the flange 55 disposed within the recess 21 formed on the casing wall 11 to effect radial location of the insert with respect to the output shafts S and accordingly with respect to the clutch members 35.

Further, the flange 55 includes a radial surface 58 disposed in contact with one of the axial stop surfaces 22 to axially position the insert I with respect to the casing C and the clutch members 35. The stop surfaces fix the position of the inserts in relation to the clutch members and support them in opposition to the axial forces applied by the spring pack P and side gears 27 upon torque application, to effect the frictional engagement between the surfaces 54 and clutch members 35.

As can readily be appreciated, the inserts I must, of necessity, be retained in relatively stationary relationship with respect to the casing C in order to transmit rotational effort from the casing to the clutch member 35 for purposes of resisting differentiation. To this end, each insert is provided with a pair of 180° spaced apart pinion pin engagement tabs 59 extending generally axially outwardly from the divergent end of the conical wall 53. Each tab is of sufficient length to extend axially inwardly to the approximate transverse center of the casing C and each includes a generally semicircular cutout 60 which receives the pinion pin 31. Thus a driving relationship between the inserts I and the casing C is established by the inter-relationship of the tabs 59 and the pinion pin 31.

The tabs 59 engage the pin 31 intermediate the pinion gears 29 and the interior surface of the cavity 17. As substantial radial thrust is applied upon the pinion gear during torque application it may be desirable to place a wear resistant thrust washer such as the washer 61 between the pinion gears and the tabs 59 to prevent excessive wear of the tabs.

The number of tabs used could of course be varied, however, two tabs on each insert provide a symmetrical arrangement of spacing along the pinion pins. If only one were used and if the interior of the casing cavity 17 were cylindrical, a spacer would have to be used between the wall of the casing and one pinion gear to retain the pinion gear equidistant with respect to the centerline of the output shafts.

Each insert I is provided with a plurality of lubricating orifices 63 to supply lubricant to the spirally progressing groove 37 of the clutch member 35. These orifices are disposed longitudinally along the insert conical wall 53 in one or more rows as desired. Lubricant within the cavity 17 of the casing C may pass through these orifices into communication with the spiral grooves 37 for distribution to the frictionally engaged surfaces. Other forms of lubricant distribution facilities could also be used without departing from the scope of the invention.

In assembling the mechanism, each of the inserts I is first placed in overlying relation to a clutch member 35. These components are then inserted through the side port opening 19 and positioned such that the cylindrical pilot surfaces 57 of the inserts properly engage the recesses 21 of the casing and the radial surfaces 58 contact the axial stop surfaces 22. The inserts are rotated to align the cutouts 60 for later insertion of the pinion pin 31. The side gears 27 are then placed in contacting relation with the clutch members 35 along the surfaces 43. Alternatively, the side gears and clutch members 35 could be integrally formed.

The pinion gears are then positioned in mesh with the side gears in 180° opposed facing relation and the bevel gear system is rotated to align the pinion gears with respect to the casing C for insertion of the pinion pin 31. If desired, thrust washers are placed upon the side gears before alignment is effected and the gears and washers are simultaneously positioned.

The spring pack P is then compressed and installed through the side port opening with the gear contacting members engaging the side gears. The gear contacting members of the spring pack must be aligned so that the openings 46 are disposed for insertion of the pinion pin. The pin is then inserted through the pinion gears and spring pack and locked to the casing C with the retainer screw 33 to complete the assembly of the device.

It is readily apparent that, in the above described embodiment, complex machining of the interior wall surface of the casing C to form cone seat surfaces has been eliminated. The insert I is positioned and retained by the easily formed axially extending flange 55 provided with the cylindrical pilot surface 57 and radial surface 58 which engage respectively the simply formed recess 21 and axial stop surface 22. Driving engagement of the insert I with the casing C, which is essential to the proper operation of the mechanism, is provided by engagement of the drive tabs 59 with the pinion pin intermediate the pinion gear and the casing.

Various of the features of the invention have been particularly shown and described, however, it should be obvious to one skilled in the art that various modifications may be made therein without departing from the scope of the invention.

I claim:

1. An insert for a limited slip differential mechanism comprising means defining a generally conical seat surface for engagement by a conical clutch member; a flange adjacent the convergent end of said conical seat surface extending generally radially outwardly defining a generally cylindrical pilot surface to radially position said insert, said flange having a radial surface spaced from said conical seat surface to axially position said insert.

2. An insert for a limited slip differential mechanism comprising a generally conical wall defining a conical seat surface, a flange adjacent the convergent end of said conical seat surface extending generally radially outwardly defining a generally cylindrical pilot surface to radially position said insert and including a generally radially directed surface to axially position said insert and at least one flange extending laterally outwardly of the divergent end of said conical wall to effect a driving relation.

3. An insert for a limited slip differential mechanism comprising a generally conical wall defining a conical seat surface, a flange adjacent the convergent end of said conical seat surface extending generally radially outwardly defining a generally cylindrical pilot surface to radially position said insert including a generally radially directed surface to axially position said insert and at least one flange extending laterally outwardly of the divergent end of said conical wall to effect a driving relation, said laterally extending flange including a generally semicircular cutout.

References Cited
UNITED STATES PATENTS

| | | | |
|---|---|---|---|
| 1,141,648 | 6/1915 | Mitchella | 192—107 X |
| 2,395,189 | 2/1946 | Lapsley et al. | 192—107 |
| 2,965,205 | 12/1960 | Winchell | 192—66 |

FRED C. MATTERN, JR., *Primary Examiner.*

ARTHUR T. McKEON, *Assistant Examiner.*